US012625721B2

(12) United States Patent
Stevens et al.

(10) Patent No.: US 12,625,721 B2
(45) **Date of Patent: *May 12, 2026**

(54) SYSTEMS AND METHODS FOR REAL-TIME FILE STORAGE AND RETRIEVAL

(71) Applicant: Servosity, Inc., Greenville, SC (US)

(72) Inventors: Damien Stevens, Greenville, SC (US); Fury Christ, Greenville, SC (US)

(73) Assignee: Servosity, Inc., Greenville, SC (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/903,513

(22) Filed: Oct. 1, 2024

(65) Prior Publication Data

US 2025/0077265 A1 Mar. 6, 2025

Related U.S. Application Data

(60) Continuation of application No. 18/322,081, filed on May 23, 2023, now Pat. No. 12,124,409, which is a continuation of application No. 17/668,717, filed on Feb. 10, 2022, now Pat. No. 11,698,809, which is a continuation of application No. 16/662,240, filed on Oct. 24, 2019, now Pat. No. 11,263,038, which is a division of application No. 15/644,104, filed on Jul. 7, 2017, now Pat. No. 10,489,186, which is a continuation of application No. 14/574,370, filed on Dec. 17, 2014, now Pat. No. 9,733,966.

(60) Provisional application No. 61/916,849, filed on Dec. 17, 2013.

(51) Int. Cl.
*G06F 9/455* (2018.01)
*G06F 11/1446* (2026.01)
*G06F 16/11* (2019.01)
*G06F 16/14* (2019.01)

(52) U.S. Cl.
CPC ...... *G06F 9/45558* (2013.01); *G06F 11/1464* (2013.01); *G06F 16/116* (2019.01); *G06F 16/148* (2019.01); *G06F 2009/45562* (2013.01)

(58) Field of Classification Search
None
See application file for complete search history.

(56) References Cited

U.S. PATENT DOCUMENTS

| | | | | |
|---|---|---|---|---|
| 9,032,399 | B1* | 5/2015 | Yang | G06F 16/58 |
| 2009/0271418 | A1* | 10/2009 | Vaghani | G06F 16/185 |
| | | | | 707/E17.05 |
| 2011/0153697 | A1* | 6/2011 | Nickolov | G06F 16/1844 |
| | | | | 707/827 |
| 2011/0185190 | A1* | 7/2011 | Berengoltz | G06F 16/18 |
| 2013/0013844 | A1* | 1/2013 | Venkatesh | G06F 16/172 |
| 2014/0237464 | A1* | 8/2014 | Waterman | G06F 16/17 |

(Continued)

*Primary Examiner* — Son T Hoang
(74) *Attorney, Agent, or Firm* — Bradley Arant Boult Cummings LLP; Adam J. Thompson, Esq.

(57) ABSTRACT

The retrieval of files can be facilitated in real-time in the general context of backup and recovery. A processor can receive a request to retrieve a particular volume of data from an object storage database. A virtual volume can be presented to an emulator for creation of a virtual machine representing the particular volume of data. A request can be received to access a particular file from the particular volume of data at a specific point in time. In response to the request to access the file, the data stream can be paused, the particular file can be fetched, and the particular file can be transmitted to the emulator.

18 Claims, 10 Drawing Sheets

(56) References Cited

U.S. PATENT DOCUMENTS

| | | | | |
|---|---|---|---|---|
| 2015/0186044 | A1* | 7/2015 | Sharma | G06F 16/58 |
| 2016/0055224 | A1* | 2/2016 | Shetty | G06F 16/128 |
| | | | | 707/624 |

\* cited by examiner

FIG. 1 *EXEMPLARY SYSTEM ARCHITECTURE*

FIG. 2 *EXEMPLARY SYSTEM PROCESS FLOW*

FIG. 3 *EXEMPLARY DATA SOURCE SELECTION PROCESS*

FIG. 4 *EXEMPLARY DATA TRANSLATION PROCESS*

500

START

502    RECEIVE STREAMING PERMISSION FOR REQUESTED DATA SOURCE

504    RETRIEVE FETCHED DATA CORRESPONDING TO REQUESTED DATA SOURCE

506    TRANSMIT FETCHED DATA CORRESPONDING TO REQUESTED DATA SOURCE TO USER'S MACHINE OR SYSTEM

508    HAS ALL FETCHED DATA CORRESPONDING TO REQUESTED DATA SOURCE BEEN RETRIEVED?

NO

YES

END

FIG. 5 *EXEMPLARY DATA STREAMING PROCESS*

FIG. 6 *EXEMPLARY DATA PRESENTATION PROCESS*

FIG. 7 *EXEMPLARY SYSTEM EMBODIMENT*

SYSTEMS AND METHODS FOR REAL-TIME FILE STORAGE AND RETRIEVAL

CROSS REFERENCE TO RELATED APPLICATION

This application is a continuation of U.S. patent application Ser. No. 18/322,081, filed on May 23, 2023 and entitled "Systems and Methods for Real-Time File Storage and Retrieval," which is a continuation of U.S. patent application Ser. No. 17/668,717, now U.S. Pat. No. 11,698,809, filed on Feb. 10, 2022, and entitled "Systems and Methods for Real-Time File Storage and Retrieval," which is a continuation of U.S. patent application Ser. No. 16/662,240, now U.S. Pat. No. 11,263,038, filed on Oct. 24, 2019, and entitled "Systems and Methods for Real-Time File Storage and Retrieval," which is a divisional of U.S. patent application Ser. No. 15/644,104, now U.S. Pat. No. 10,489,186, filed on Jul. 7, 2017, and entitled "Systems and Methods for Real-Time File Storage and Retrieval," which is a continuation of and claims priority to and benefit of U.S. patent application Ser. No. 14/574,370, now U.S. Pat. No. 9,733,966, filed on Dec. 17, 2014, and entitled "Systems and Methods for Real-Time File Storage and Retrieval," which claims priority to and benefit of U.S. Provisional Patent Application No. 61/916,849, filed Dec. 17, 2013, and entitled "Real-Time File Storage and Retrieval System Using Object Data to File System Converter," which are incorporated herein by reference as if set forth herein in their entireties.

TECHNICAL FIELD

The present systems and methods relate generally to file storage and retrieval.

BACKGROUND

Non-POSIX ("Portable Operating System Interface") storage has become a preferable means of storage for large amounts of computer data primarily because of the scalability and reliability of the formats. Unfortunately, data stored in non-POSIX formats is more difficult to access than data stored in POSIX formats. Generally, this difficulty is because non-POSIX storage is not compatible with the typical file data format used by most computers. Additionally, non-POSIX storage generally does not support both read and write functionality (e.g., it is read only of arbitrary data that is not in a files system with directories, files, permissions, etc.). Thus, when a user wants to store a large amount of data in the cloud in non-POSIX format, there are difficulties in later accessing the data quickly. Multimedia streaming, a common non-POSIX use case, has overcome these difficulties because the data in a movie or song generally are presented in a certain order and a buffer can be downloaded accordingly. If, however, the user is attempting to download an entire backup of a system from non-POSIX storage, then these difficulties are readily apparent as there is generally no way to buffer an operating system that does not have files that are presented in a certain order. Thus, the download takes an exceedingly long amount of time, and the user cannot access the backup until the entire file has been downloaded.

Therefore, there is a long-felt but unresolved need for a system or method that enables real-time file storage and retrieval from non-POSIX to POSIX formats.

BRIEF SUMMARY OF THE DISCLOSURE

Briefly described, and according to one embodiment, aspects of the present disclosure generally relate to methods and systems for providing real-time streaming of data in non-POSIX formats to systems in POSIX formats in the general context of system backup and recovery. In one embodiment, the system backup can be stored in non-POSIX format (e.g., object data format or any other arbitrary data format that is not POSIX compliant) and then converted into POSIX format (e.g., file system format with directories, files, permissions, etc. that is generally associated, but should not be limited to, operating systems such as Unix®, Linux®, or Windows®) during the recovery process. In various embodiments, the system backup can be stored in object data format and then converted to a block device and then into file system format during the recovery process.

For example, a user can copy and archive an entire system to a remote server and, in the event that a system recovery is necessary, restore the system from the backup in real-time. Usually, these recoveries are necessary when a system crashes or is destroyed or certain files are lost. Thus, when the system crashes, the user can start the restoration process and begin using the system almost instantaneously, instead of waiting for the entire backup to download, which traditionally could take hours or even days. In one embodiment, the user can incrementally back up the system to the cloud instead of backing up the entire system. In various embodiments, the user can use other types of backups including, but not limited to, differential backups instead of backing up the entire system.

As will be described in greater detail herein, aspects of the disclosed system include a server and a non-POSIX database. Examples of content that may be backed up include files, folders, drives, operating systems, or combinations thereof. As will be understood, the present disclosure does not impose any limitations on the type or other specifics of the content operating on the systems that are being backed up.

According to an aspect of the present disclosure, the disclosed system allows the user to access the backed-up system or data as it downloads and present both read and write requests to the backup. In various embodiments, this functionality is achieved through presenting the partially-downloaded backup to a virtual machine device, such as an emulator or hypervisor, as a virtual volume, which, in this instance, is generally a file that appears to the virtual machine device as the entire file even though it is only a partial version of the original file. Thus, in these (and other) embodiments, the system continues to download the full backup while the emulator or hypervisor runs the presented virtual volume. In one or more embodiments, as the user requests read or write functionality, the system specifically retrieves that data, prioritizes the request over the backup download, so that the system will continue to function as if the entire backup is available. In particular embodiments, once the entire backup has been downloaded, the system merges any write transactions with the backup and live-migrates from the virtual volume to the entire, merged volume.

In one embodiment, a computer system for real-time data retrieval, the computer system comprising: a non-POSIX storage database, wherein the non-POSIX storage database stores non-POSIX backup data for one or more POSIX data sources; a server operatively connected to a computing network, a hypervisor, and the non-POSIX storage database, the server comprising at least one processor operative to:

receive, from a computer system operatively connected to the computing network, an indication of a particular data source of the one or more POSIX data sources to be restored from the non-POSIX backup data; in response to receiving the indication of the particular data source to be restored from the non-POSIX backup data, retrieve an index corresponding to the non-POSIX backup data for the particular data source; fetch at least a portion of the non-POSIX backup data from the non-POSIX storage database corresponding to the non-POSIX backup data for the particular data source based on the index; assemble the at least a portion of the non-POSIX backup data corresponding to the non-POSIX backup data for the particular data source as a virtual volume; and present the virtual volume to the hypervisor for creation of a virtual machine resembling the particular data source and accessible by the computer system.

In one embodiment, a computer-implemented method for real-time data retrieval, the method comprising: receiving, from a computer system operatively connected to a computing network, an indication of a particular data source of one or more POSIX data sources to be restored from non-POSIX backup data stored at a non-POSIX storage database; in response to receiving the indication of the particular data source to be restored from the non-POSIX backup data, retrieving an index from a server operatively connected to the non-POSIX storage database, the index corresponding to the non-POSIX backup data for the particular data source; fetching, by the server, at least a portion of the non-POSIX backup data from the non-POSIX storage database corresponding to the non-POSIX backup data for the particular data source based on the index; assembling the at least a portion of the non-POSIX backup data corresponding to the non-POSIX backup data for the particular data source as a virtual volume; presenting the virtual volume to a hypervisor operatively connected to the server for creation of a virtual machine resembling the particular data source and accessible by the computer system; and fetching any unfetched portions of the non-POSIX backup data from the non-POSIX storage database based on the index and associating the unfetched portions of the non-POSIX backup data to the virtual volume.

In one embodiment, a computer system for real-time file retrieval, the computer system comprising: at least one processor operative to: receive, from a particular computing system, a request to retrieve a particular volume of data from an object storage database: in response to receiving the request to retrieve the particular volume of data, present a virtual volume based on particular object data to an emulator for the creation of a virtual machine representing the particular volume of data, wherein the emulator is configured for receiving the particular volume of data as a data stream over a particular period of time; receive a request from the particular computing system to access a particular file from the particular volume of data at the virtual machine at a specific point in time during the particular period of time; and in response to receiving the request to access the particular file: pause the data stream of the data of the particular volume to the emulator; fetch the particular file; and transmit the particular file to the emulator.

According to one aspect of the present disclosure, the at least one processor is further operative to: fetch any unfetched portions of the non-POSIX backup data from the non-POSIX storage database based on the index; and associate the unfetched portions of the non-POSIX backup data with the virtual volume. Further, the at least one processor is further operative to: receive a request from the computing system to fetch a particular data item of the non-POSIX backup data from the non-POSIX storage database; in response to receiving the request to fetch the particular data item: pause the fetching of the unfetched portions of the non-POSIX backup data from the non-POSIX storage database; locate the particular data item based on the index; and in response to locating the particular data item based on the index: fetch the non-POSIX data corresponding to the particular data item from the non-POSIX storage database; and associate the particular data item with the virtual volume. Moreover, the at least one processor is further operative to: in response to associating the particular data item with the virtual volume, locate other data items related to the particular data item; and in response to locating the other data items: fetch the non-POSIX data corresponding to the other data items from the non-POSIX storage database; and associate the other data items with the virtual volume. Additionally, the computer system of claim 4, where the at least one processor is further operative to, upon determining that the other data items related to the particular data item have been associated with the virtual volume, resuming the fetching of the unfetched portions of the non-POSIX backup data and associating of the unfetched portions of the non-POSIX backup data with the virtual volume.

According to one aspect of the present disclosure, the at least one processor is further operative to: receive, from the computer system, a write request for the particular data item; in response to receiving the write request for the particular data item, generate a copy of the particular data item and enable the computer system to write changes to the copy of the particular data item. Also, the at least one processor is further operative to: in response to locating the particular data item based on the index, locate other data items related to the particular data item; in response to locating the other data items: fetch the non-POSIX data corresponding to the other data items from the non-POSIX storage database; and associate the other data items with the virtual volume; upon determining that the other data items related to the particular data item have been associated with the virtual volume, resume the fetching of the unfetched portions of the non-POSIX backup data and associating of the unfetched portions of the non-POSIX backup data with the virtual volume; and upon determining that all portions of the non-POSIX backup data have been associated with the virtual volume, merge the copy of the particular data item with the particular data item on the virtual volume.

According to one aspect of the present disclosure, the at least one processor is further operative to, in response to receiving the indication of the particular data source to be restored from the non-POSIX backup data, receive streaming permission for the particular data source. Moreover, the streaming permission comprises information to establish a secure connection between the server and the computer system.

According to one aspect of the present disclosure, the computer-implemented method for real-time data retrieval further comprising: receiving a request, from the computing system to fetch a particular data item of the non-POSIX backup data from the non-POSIX storage database; in response to receiving the request to fetch the particular data item: pausing the fetching of the unfetched portions of the non-POSIX backup data from the non-POSIX storage database; locating the particular data item based on the index; and in response to locating the particular data item based on the index: fetching the particular data item from the non-POSIX storage database; and associating the particular data item with the virtual volume. Also, the method further comprising: in response to associating the particular data item with the virtual volume, locating other data items related to the particular data items; fetching the other data items from the non-POSIX storage database; and associating the other data items with the virtual volume. Additionally, the method further comprising, upon determining that the other data items related to the particular data item have been associated with the virtual volume, resuming the fetching of the unfetched portions of the non-POSIX backup data and associating of the unfetched portions of the non-POSIX backup data with the virtual volume.

According to one aspect of the present disclosure, the computer-implemented method for real-time data retrieval further comprising: receiving, from the computer system, a write request for the particular data item; in response to receiving the write request for the particular data item, generating a copy of the particular data item and enabling the computer system to write changes to the copy of the particular data item. Moreover, the method further comprising: in response to locating the particular data item based on the index, locating other data items related to the particular data item; in response to locating the other data items: fetching the other data items from the non-POSIX storage database; and associating the other data items with the virtual volume; upon determining that the other data items related to the particular data item have been associated with the virtual machine, resuming the fetching of the unfetched portions of the non-POSIX backup data and associating of the unfetched portions of the non-POSIX backup data with the virtual volume; and upon determining that all portions of the non-POSIX backup data have been associated with the virtual volume, merging the copy of the particular data item with the particular data item on the virtual volume.

According to one aspect of the present disclosure, the computer-implemented method for real-time data retrieval further comprising, in response to receiving the indication of the particular data source to be restored from the non-POSIX backup data, receive streaming permission for the particular data source.

According to one aspect of the present disclosure, the computer-implemented method for real-time data retrieval further comprising, in response to receiving the indication of the particular data source to be restored from the non-POSIX backup data, generating an index request for locating the index to be retrieved.

According to one aspect of the present disclosure, the computer system for real-time file retrieval, wherein the at least one processor is further operative to, in response to transmitting the particular file to the emulator: identify one or more files related to the particular file; stream the data associated with the one or more files to the emulator; receive an indication that all of the data associated with the one or more files has been streamed to the emulator; and based on receiving the indication that all of the data associated with the one or more files has been streamed to the virtual machine, resume the paused data stream of the data of the particular volume to the emulator.

According to one aspect of the present disclosure, the computer system for real-time file retrieval, wherein the at least one processor is further operative to: in response to receiving the request to retrieve the particular volume of data, retrieve an index corresponding to the volume of data; and fetch the data of the particular volume of data to be streamed as the data stream over the particular period of time based on the index.

These and other aspects, features, and benefits of the claimed system and methods will become apparent from the following detailed written description of the preferred embodiments and aspects taken in conjunction with the following drawings, although variations and modifications thereto may be effected without departing from the spirit and scope of the novel concepts of the disclosure.

BRIEF DESCRIPTION OF THE DRAWINGS

The accompanying drawings illustrate one or more embodiments and/or aspects of the disclosure and, together with the written description, serve to explain the principles of the disclosure. Wherever possible, the same reference numbers are used throughout the drawings to refer to the same or like elements of an embodiment.

DETAILED DESCRIPTION

Overview

Figure 1:
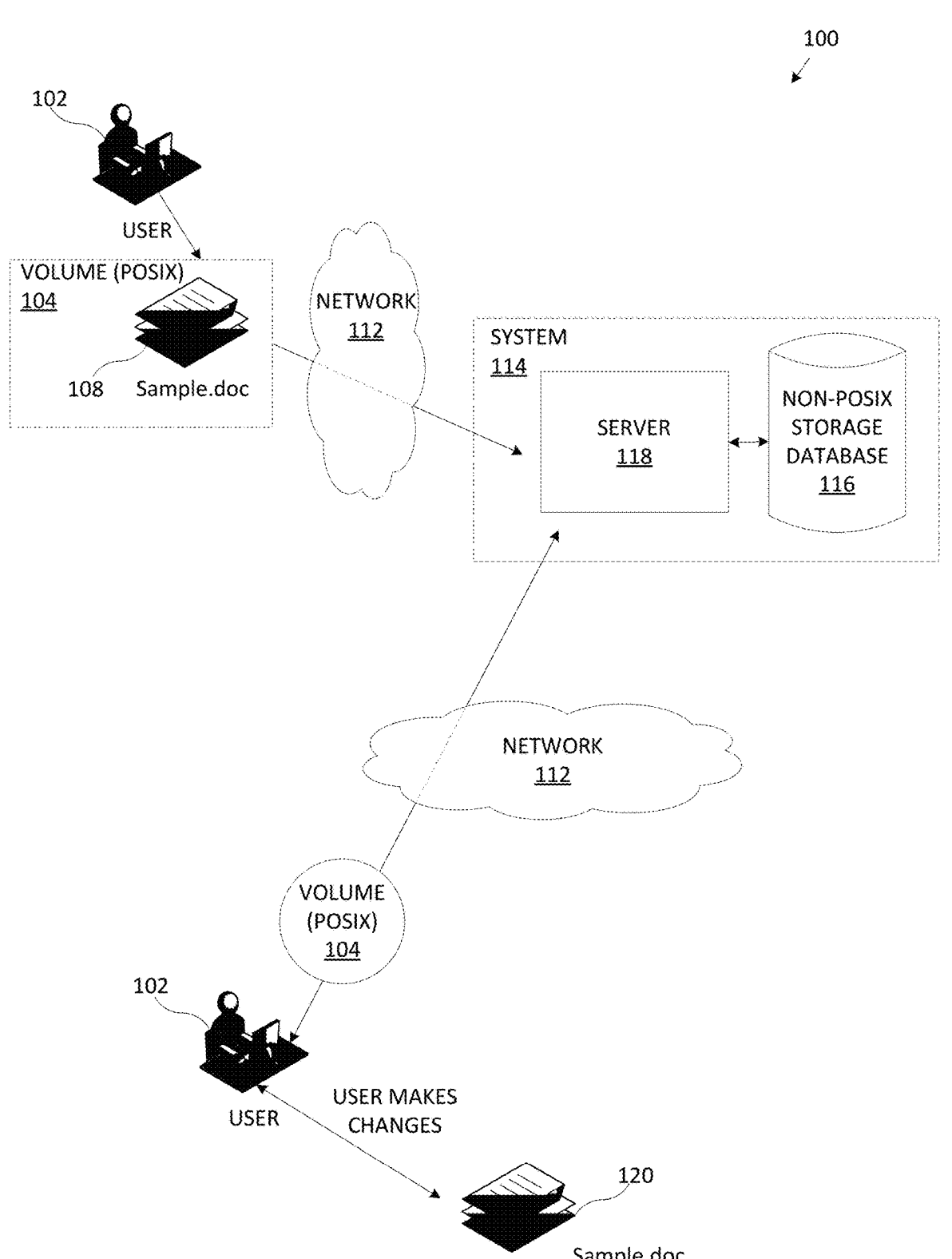
FIG. 1 shows an exemplary block diagram of the overall system architecture according to a particular embodiment of the present system.

For the purpose of promoting an understanding of the principles of the present disclosure, reference will now be made to the embodiments illustrated in the drawings and specific language will be used to describe the same. It will, nevertheless, be understood that no limitation of the scope of the disclosure is thereby intended; any alterations and further modifications of the described or illustrated embodiments, and any further applications of the principles of the disclosure as illustrated therein are contemplated as would normally occur to one skilled in the art to which the disclosure relates. All limitations of scope should be determined in accordance with and as expressed in the claims.

Whether a term is capitalized is not considered definitive or limiting of the meaning of a term. As used in this document, a capitalized term shall have the same meaning as an uncapitalized term, unless the context of the usage specifically indicates that a more restrictive meaning for the capitalized term is intended. However, the capitalization or lack thereof within the remainder of this document is not intended to be necessarily limiting unless the context clearly indicates that such limitation is intended.

In the following text, references to items in the singular should be understood to include items in the plural, and vice versa, unless explicitly stated otherwise or clear from the text. Grammatical conjunctions are intended to express any and all disjunctive and conjunctive combinations of conjoined clauses, sentences, words, and the like, unless otherwise stated or clear from the context.

Aspects of the present disclosure generally relate to methods and systems for providing real-time streaming of data in non-POSIX formats to systems in POSIX formats in the general context of system backup and recovery. In one embodiment, the system backup can be stored in non-POSIX format (e.g., object data format) and then converted into POSIX format (e.g., file system format) during the recovery process. In various embodiments, the system backup can be stored in object data format and then converted to a block device and then into file system format during the recovery process.

For example, a user can copy and archive an entire system to a remote server and, in the event that a system recovery is necessary, restore the system from the backup in real-time. Usually, these recoveries are necessary when a system crashes or is destroyed or certain files are lost. Thus, when the system crashes, the user can start the restoration process and begin using the system almost instantaneously, instead of waiting for the entire backup to download, which traditionally could take hours or even days. In one embodiment, the user can incrementally back up the system to the cloud instead of backing up the entire system. In various embodiments, the user can use other types of backups including, but not limited to, differential backups instead of backing up the entire system.

As will be described in greater detail herein, aspects of the disclosed system include a sever and a non-POSIX database. Examples of content that may be backed up include files, folders, drives, operating systems, or combinations thereof. As will be understood, the present disclosure does not impose any limitations on the type or other specifics of the content operating on the systems that are being backed up.

According to an aspect of the present disclosure, the disclosed system allows the user to access the backed-up system or data as it downloads and present both read and write requests to the backup. In various embodiments, this functionality is achieved through presenting the partially-downloaded backup to a virtual machine device, such as an emulator or hypervisor, as a virtual volume, which, in this instance, is generally a file that appears to the virtual machine device as the entire file even though it is only a partial version of the original file. Thus, in these (and other) embodiments, the system continues to download the full backup while the emulator or hypervisor runs the presented virtual volume. In one or more embodiments, as the user requests read or write functionality, the system specifically retrieves that data, prioritizes the request over the backup download, so that the system will continue to function as if the entire backup is available. In particular embodiments, once the entire backup has been downloaded, the system merges any write transactions with the backup and live-migrates from the virtual volume to the entire, merged backup.

Exemplary System Architecture

Referring now to the figures, FIG. 1 illustrates an overview 100 of one embodiment of the present system 114 for providing real-time file storage and retrieval. Details of providing real-time file storage and retrieval will be better understood in connection with the discussion of FIGS. 2-9, described in greater detail below.

As shown in FIG. 1, the system 114 includes, in one embodiment, a server 118 and a non-POSIX storage database 116. One skilled in the art will appreciate that the system 114 is not limited to the configuration in FIG. 1, but can be any combination of servers, databases, and/or other computing components necessary to carry out the functions of the system 114. Further, a non-POSIX storage database 116 can be a local database or a remote database and can be in any non-POSIX format, including, but not limited to, object data format.

Still referring to FIG. 1, in one non-limiting example, a user 102 creates, at a first point in time, one version of a document 108, which is backed up, over a network 112, as part of a volume (POSIX) 104 in the system 114. One skilled in the art will appreciate that a user 102 can create any combination of documents and other files and that all of these data items would be stored as part of a backup of a volume 104 in the system 114. For example, the system 114 can store a copy of the entire hard drive of a machine (e.g., volume 104), including its operating system and all of the files stored on the machine. Generally, the system 114 can store an infinite number of the changes to a certain set of data at a certain point in time. Thus, when a user 102 makes changes to any of the files that are included in a volume 104, these new files, such as a second version of a document 108, generally are backed up, over a network 112, as another version of the backup of volume 104 in the system 114. One skilled in the art will appreciate that this other version of the backup of volume 104 can be a completely new copy of a hard drive, a copy of only the changes to files on a hard drive, a copy of only the changed files on a hard drive, etc.

In one embodiment, a server 118 receives the backups of the various volumes 104 that will be stored in a non-POSIX storage database 116. In one embodiment, backups of volumes 104 stored in the non-POSIX storage database 116 are stored in object data format or other suitable non-POSIX format, which provides the ability to store more backups of volumes 104 in the same non-POSIX storage database 116. Additionally, downloads of non-POSIX format data, such as during recovery of a volume 104, scale linearly, which may result in faster download times than POSIX storage and may avoid boot storms (e.g., degradations of service that occur when multiple users boot systems all at once). One skilled in the art will appreciate that the system 114 places no limitation on the type, format, or size of data that is stored as the various backups, on the type of machine from which the various backups of the volumes 104 are created, or on the number of versions of the backups of volumes 104 that can be created.

Continuing with the description of FIG. 1, when the user 102 later needs to retrieve the data that was stored in the system 114, the user 102 selects which backup or backups to retrieve and restore as the system 114 places no limitation on the number of backups that the user 102 can restore. One skilled in the art will appreciate that the user 102 may need to retrieve a backup of a volume 104 for various reasons, including, but not limited to, the machine that the backup was created from is no longer functional, a document 108 on the backup has been lost, etc. Once a user 102 selects which backup to retrieve and restore, the system 114 begins retrieving the object data (or other non-POSIX data) that comprises the backup of a volume 104 and translating and assembling that data into a POSIX format (such as file data). In various embodiments, the system 114 assembles a partial copy of the volume 104 as a virtual volume and mounts (e.g., makes the data accessible) the virtual volume so that an emulator, hypervisor, or other similar virtual machine device reads and presents it as a fully functional and complete version of the volume 104. In one embodiment, this mounting is accomplished by presenting a full file directory to the emulator or hypervisor even though all of the files are not yet available. Further, as described in greater detail below, the system 114 generally permits a user 102 to interact with the virtual volume as if it were the complete copy of volume 104. Accordingly, while the system 114 is restoring the volume 104, the user 102 can access and create a new version of a document 120 or other file from the volume 104. Once the system has finished restoring the volume 104, the system 114 reconciles and merges the completed volume 104 with any changes that a user 102 made while the volume was being restored so that a current, comprehensive, and full copy of the volume 104 is created. The system 114 then migrates the emulator, hypervisor, or other similar device from the virtual volume to the full copy of the volume 104. In this process, the system, in various embodiments, changes the source volume that the emulator, hypervisor, etc. is running from the virtual volume to the full copy (e.g., without impacting the user's ability to access the data). This process will be explained in more detail in conjunction with the descriptions of FIGS. 2-6.

Exemplary System Process

Figure 2:
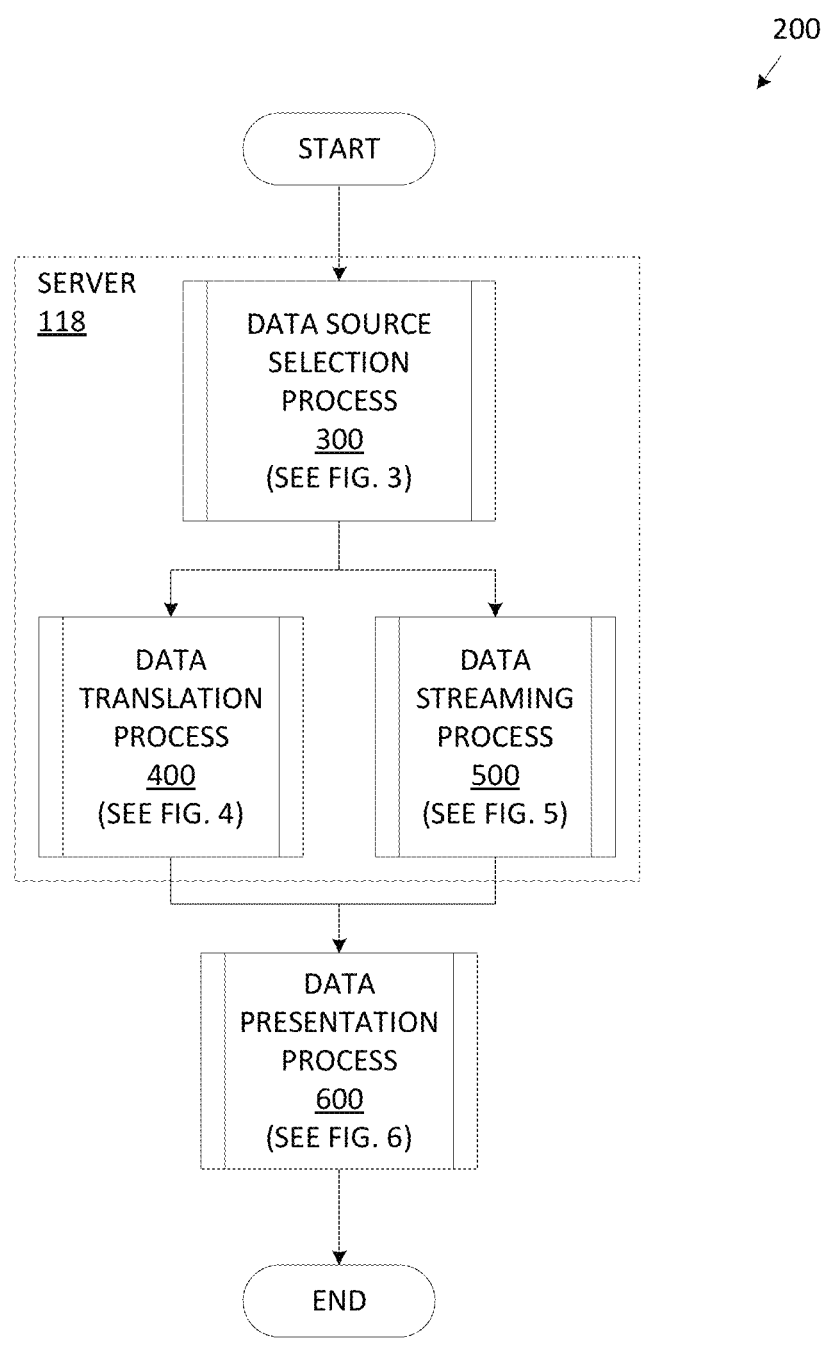
FIG. 2 is a flowchart showing an exemplary system process flow according to at least one embodiment, which may be executed by one or more of the elements of the system architecture depicted in FIG. 1.

FIG. 2 illustrates an exemplary high-level system process 200 of the system 114 for retrieving and restoring data, according to one embodiment of the present disclosure. As will be understood by one of skill in the art, the location details illustrated in FIG. 2 are not intended to be limiting in any way. In various embodiments, as shown, some of the processes can run on the server 118 while others run on a user's machine. In some embodiments, all of the processes can run on a portable storage device, such as a thumb drive, that is connected to the user's machine, or on a local drive, or via some other similar mechanism. As will be further understood and appreciated, the steps and processes shown in FIG. 2 (and those of all other flowcharts shown and described herein) may operate concurrently and continuously, are generally asynchronous and independent, and are not necessarily performed in the order shown.

In particular embodiments, the restoration process begins with the data source selection process 300, which will be described in greater detail in connection with the explanation of FIG. 3. In the data source selection process 300, the user 102 determines and selects which data source, or volume, to restore. In one embodiment, the data source selection process 300 is automated and non-user dependent. In various embodiments, the selection of the data source initiates both the data translation process 400, which will be described in greater detail in connection with the explanation of FIG. 4, and the data streaming process, which will be described in greater detail in connection with the explanation of FIG. 5. In various embodiments, in the data translation process 400, the system fetches, or retrieves, the selected data source from the non-POSIX storage, such as object storage. The data translation process also, in various embodiments, is responsible for retrieving any data that has been requested by the user 102. In the data streaming process 500, the system transmits the fetched data to the user's 102 machine. In one embodiment, the data streaming process 500 is done by trickle load (e.g., streaming data as it fetched or retrieved by the system instead of after it has all been fetched or retrieved). In various embodiments, as the data is being fetched and streamed, the data presentation process 600, which will be described in greater detail in connection with the explanation of FIG. 6, is occurring. In various embodiments, the data presentation process 600 is the process by which the data source is presented to an emulator, hypervisor, or other similar device for use by the user 102. While the rest of the data source continues to be fetched and streamed, the user 102 may request other files and make changes to those files. In various embodiments, once the fetching and streaming are completed, the system 114 merges the changes with the original volume and migrates the emulator, hypervisor, etc. from the presented data to the fetched data. After the migration occurs, the restoration process is complete.

Exemplary Data Source Selection Process

Figure 3:
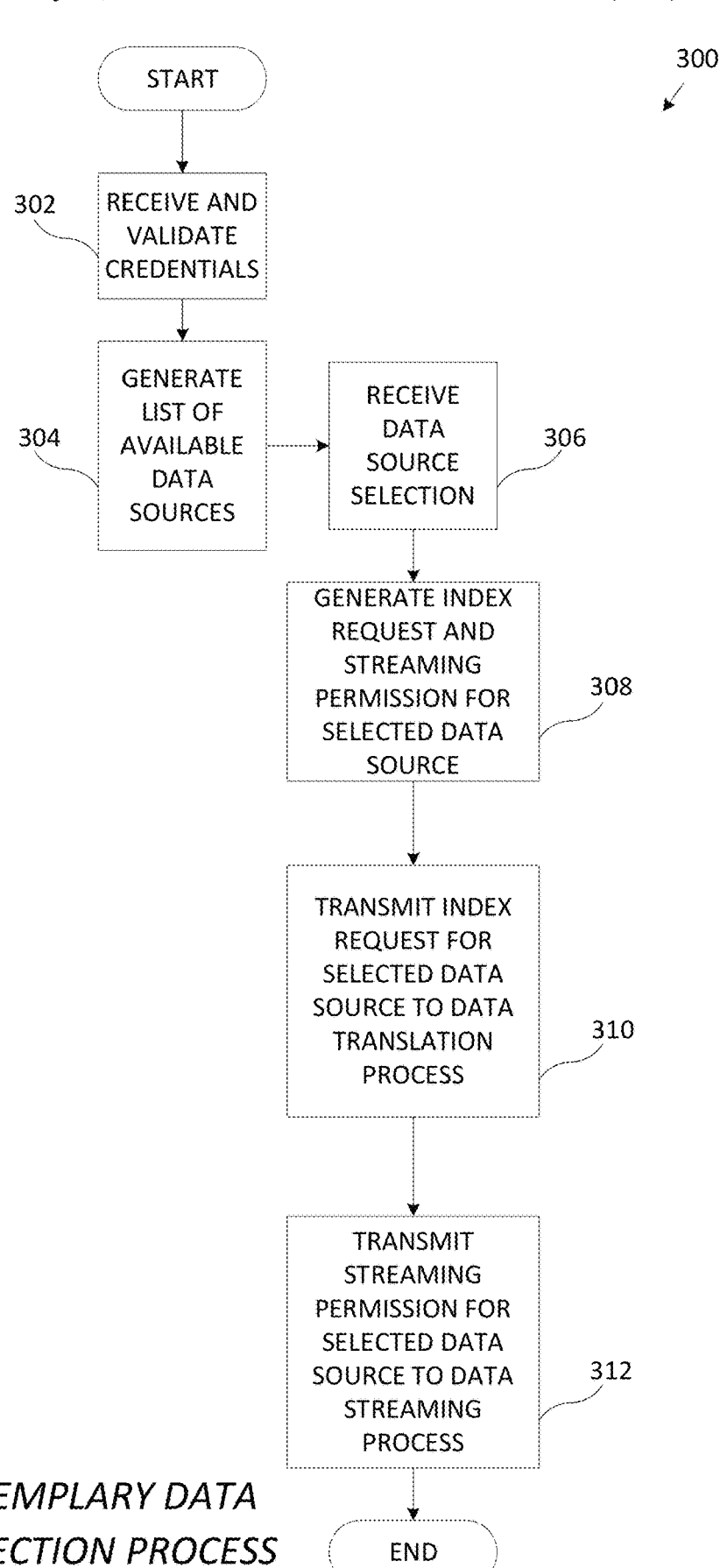
FIG. 3 is a flowchart showing an exemplary data source selection process according to one embodiment of the present system.

Turning now to FIG. 3, a flowchart representing an exemplary data source selection process 300 is shown for determining which data source is to be restored, according to one embodiment of the present disclosure. Starting with step 302, which is optional, the server 118 receives a user's credentials. One skilled in the art will appreciate that these credentials may be any form of authentication: online username and password, personal identification number, biometric scan, digital certificate, etc. At step 304, the server 118 generates a list of the user's available data sources. In various embodiments, these data sources are stored in a non-POSIX format (e.g., discrete chunks or blocks of data that contain various parts of the backup) and include various volumes or others forms of backups that the user or the user's machine has previously backed up with the system. Data sources may be, for example, a backup copy of a file on the user's machine, a file containing all of the changes to a folder since the last backup of that folder, an entire backup copy of a hard drive, etc. From this list of available data sources, the user selects the data source to restore and the server receives that selection at step 306. The user may, in various embodiments, select any combination of files from various points in time, entire operating systems, etc. to restore.

At step 308, the server, in various embodiments, generates index requests and streaming permissions for the selected data sources. In one embodiment, index requests correspond to a specific index for the selected data source and indicate to the server which index to use when fetching the selected data. The index requests may include information identifying where the index is located, when the index was created, etc. Details regarding indices will be explained in more detail in connection with the explanation of FIG. 4. In various embodiments, streaming permissions provide the IP address of the user's machine, network connection, port, protocol, etc. that will be used to transmit the selected data. Moreover, the streaming permissions can contain the authentication (e.g., key, etc.) to decrypt or encrypt the selected data or algorithms to compress the selected data, as desired by the user. In one embodiment, streaming permissions relate to establishing a secure connection between the server and the user's machine and will be explained in more detail in connection with the explanation of FIG. 5. Continuing at step 310, the index request for the selected data source is transmitted to the data translation process 400. Finally, the streaming permission is transmitted to the data streaming process 500 at step 312. After the streaming permission is transmitted, the data source selection process ends. At this point, the data translation process 400 and data streaming process 500 generally commence simultaneously.

Exemplary Data Translation Process

Figure 4:
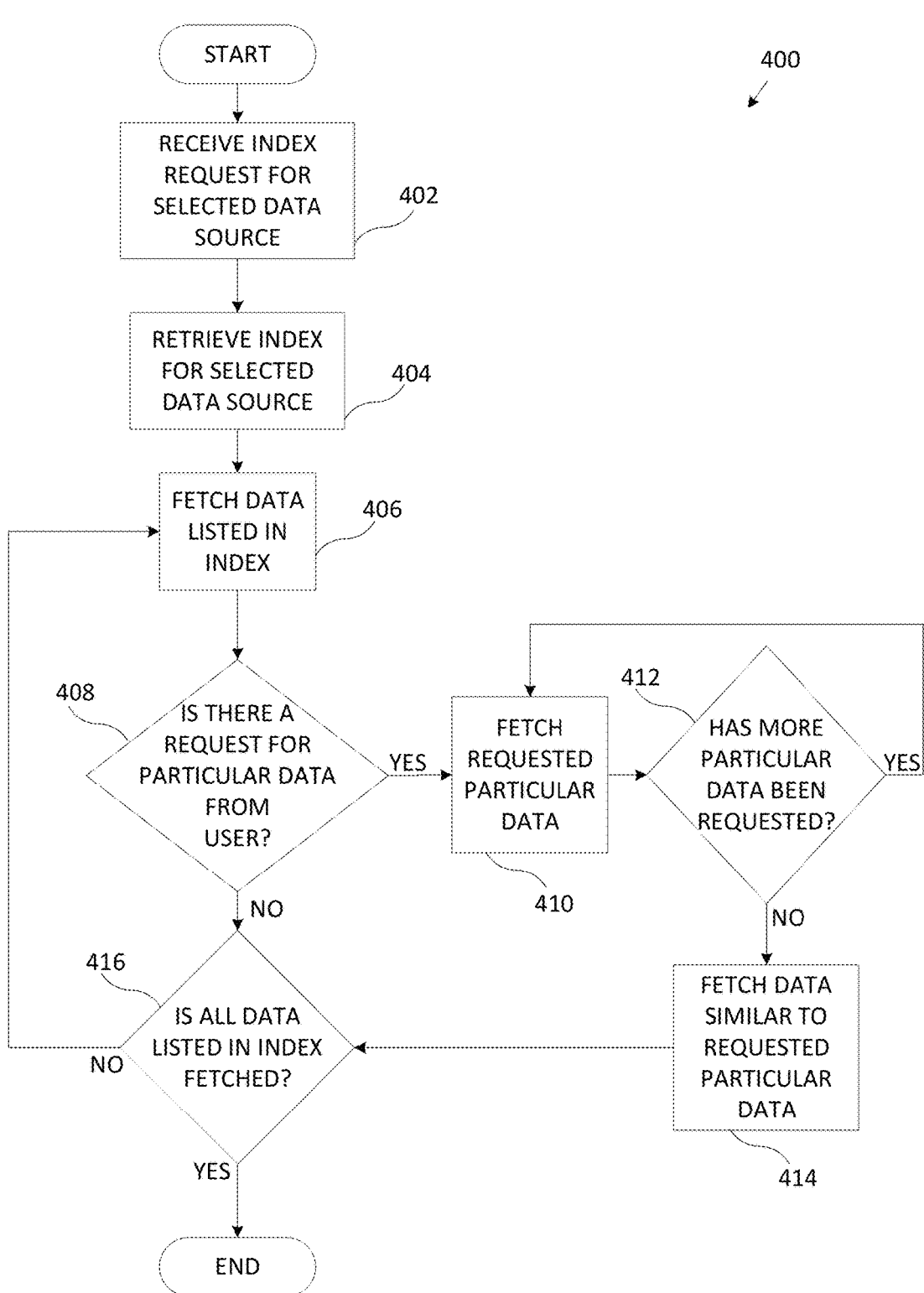
FIG. 4 is a flowchart showing an exemplary data translation process according to one embodiment of the present system.

Now referring to FIG. 4, an exemplary data translation process 400 is shown for fetching selected data as listed in the index and fetching data specifically requested by the user during the restoration process. At step 402, the index request for the selected data source is received and processed. In one embodiment, this request identifies the specific index that corresponds to the selected data and where that index is located (e.g., with the selected data or in another separate database). Generally, each data source may have a corresponding index that identifies where each block or chunk of data is located, what data is contained within that block or chunk, and in what order to retrieve each block or chunk to assemble the data source. In one embodiment, the index can contain metadata regarding the data (e.g., date of creation of data source, user who created data source, etc.), a list of file locations, etc. For example, the index can identify that a certain file, such as a document 108, is stored in a particular block and when to fetch that block.

In various embodiments, because the data sources are stored in non-POSIX formats, the indices allow the translation from non-POSIX to POSIX formats. In various embodiments, the index contains a list of all of the non-POSIX data and the POSIX data to which that non-POSIX data relates. In this way, in some embodiments, the index functions as a map or link between an emulator or hypervisor's request for certain chunks of data and the corresponding non-POSIX data that has been stored. For example, when a certain document 108 is needed in a POSIX format, the system must use the index to locate the corresponding non-POSIX chunk or block that contains the data that represents that document 108. Further, one skilled in the art will appreciate that the system may place no constraints on the type of non-POSIX format or POSIX format that the indices translate between (e.g., object storage to block device, object storage to file system, object storage to NFS protocol as a file system, etc.). Accordingly, at step 404 the server retrieves the specific index for the selected data source.

At step 406, the server begins fetching the data listed in the index (e.g., the non-POSIX data corresponding to the files, documents, etc. comprising the data source). As has been previously referenced, the system may allow a user to restore a backup of a document, folder, hard drive, etc. while, at the same time, permitting the user to access, in real-time files, folders, etc. in the backed-up data before it is completely restored. Accordingly, the server generally fetches the data that comprises the selected data source in the order listed in the index unless and until the user requests particular data from the server. At step 408, the server determines whether there is a request for particular data from the user (e.g., a request to access a specific file or folder). If there is no request, then the server determines, at step 416, whether all of the data listed in the index has been fetched by comparing the list of fetched data to the index (e.g., whether the data source has been entirely restored). If all of the data has not been fetched, then the server loops back to step 406. Additionally, if the server determines, at step 408, that there is a request for particular data from the user, then the server, at step 410, fetches that requested particular data. Then, at step 412, the server determines whether the user has requested more particular data. If the user has requested more particular data, then the process returns to step 410 to fetch that requested particular data. If the user has not requested more particular data, then the server fetches data that is similar to the requested particular data as identified in the index data (e.g., the rest of the files in the folder that contained the requested particular data). One skilled in the art will appreciate that step 414 allows the system to optimize its efficiency because a user is more likely to request data around the data that the user has already requested (e.g., after viewing one image in a folder, a user is more likely to view the rest of the images in the folder). After fetching the similar data, the server proceeds to step 416. If the all data listed in the index has been fetched, then the data translation process ends.

A particular example may be useful. If a particular user is in the process of restoring an entire operating system and files for a particular machine (e.g., laptop, desktop, tablet, virtual machine, server system, etc.), the index provides a list, in order, of all of the files that will be necessary to run the machine while the restoration takes place (see, e.g., step 402-406). Continuing with this example, once the necessary files have been fetched, the particular user will be able to use the machine as if it had been entirely restored, even though the restoration process is not complete. Thus, in this example, if the particular user wants to open a certain file that has yet to be fetched and restored, then the present system fetches that particular file, as shown in steps 408-410. The particular user may be able to operate the machine as if it had been entirely restored. To further understand this example, however, an explanation of the data streaming process 500 may be useful.

Exemplary Data Streaming Process

Figure 5:
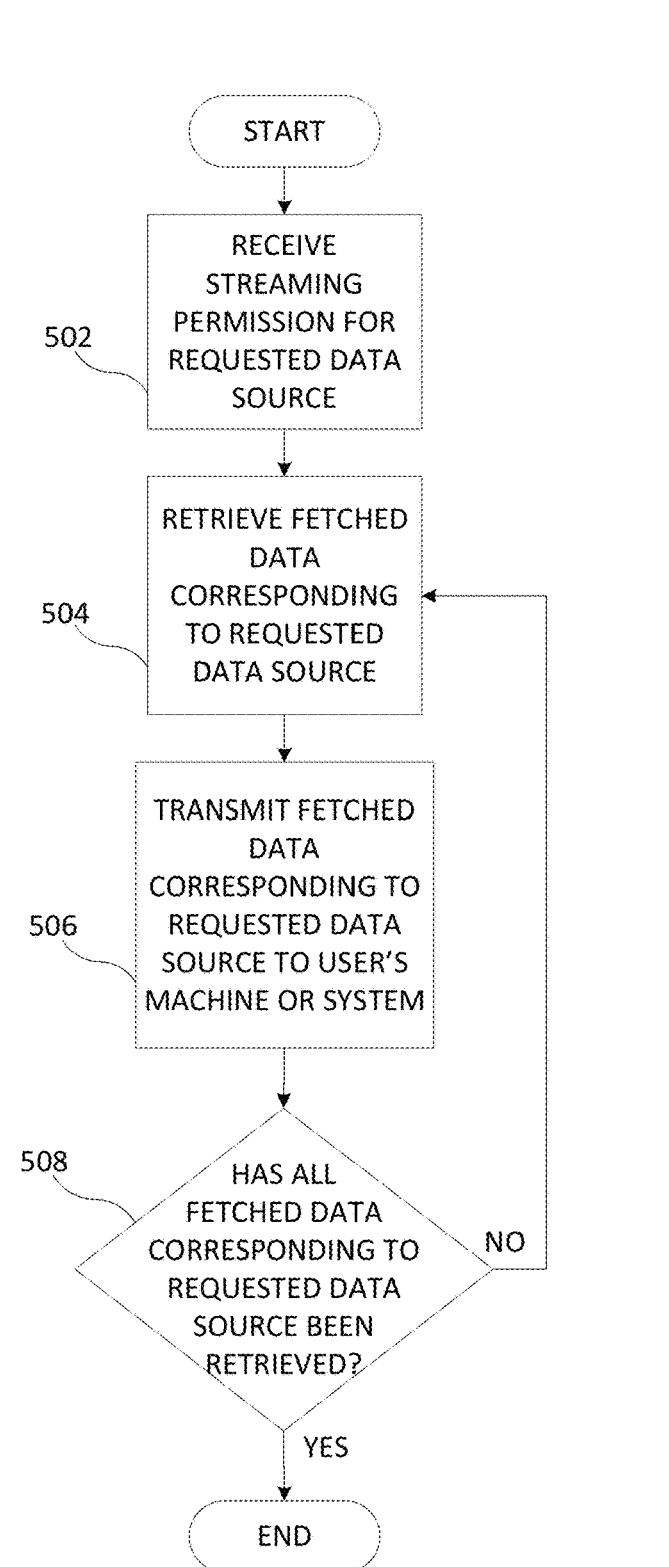
FIG. 5 is a flowchart showing an exemplary data streaming process according to one embodiment of the present system.
Figure 6:
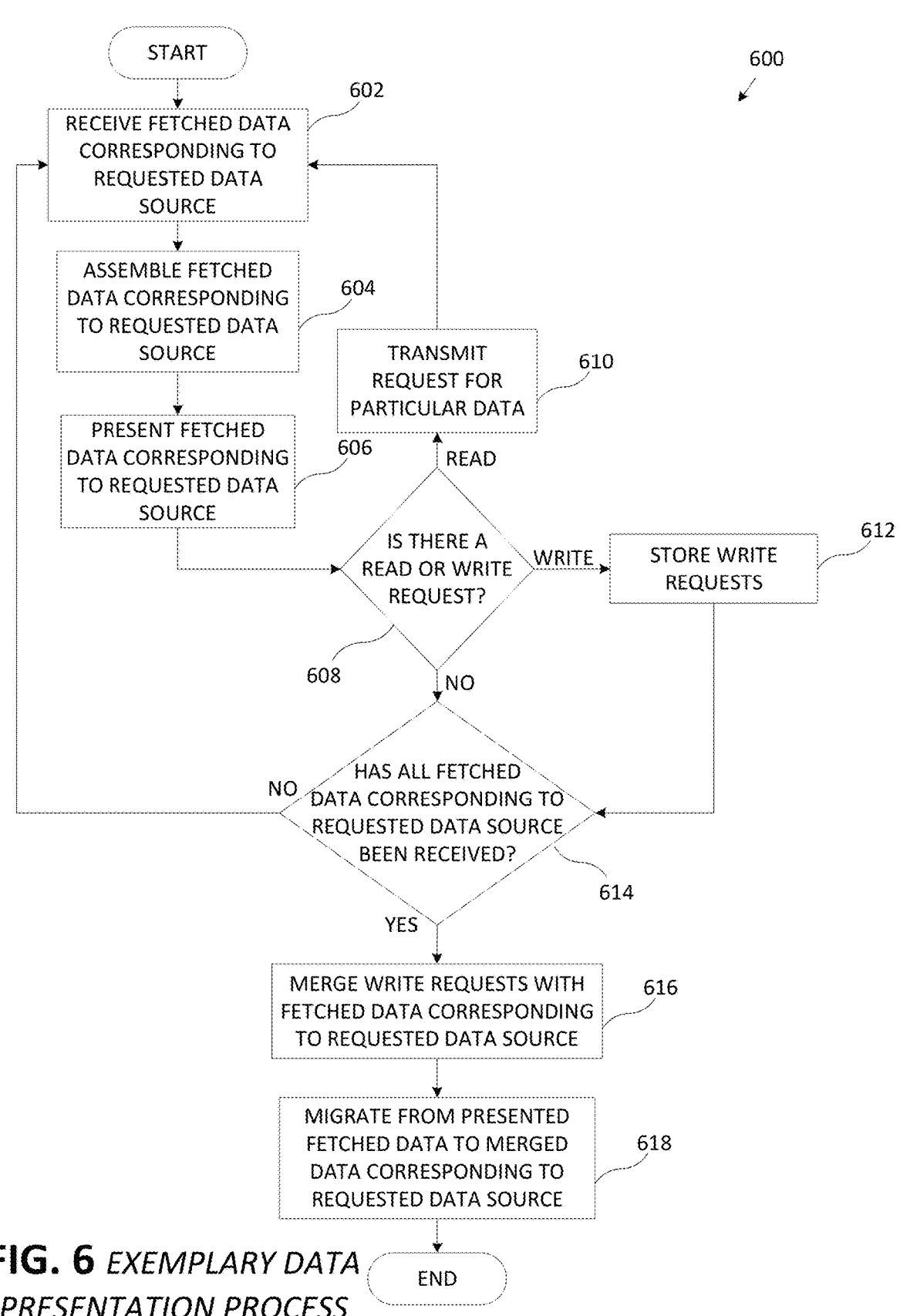
FIG. 6 is a flowchart showing an exemplary data presentation process according to one embodiment of the present system.

Referring now to FIG. 5, a flowchart representing an exemplary data streaming process 500 is shown, according to one embodiment of the present system. The process begins at step 502 where the streaming permission for the requested data source is received and processed. This permission may be necessary to establish a secure connection between the system 114 and the machine that the user 102 is restoring. According to one embodiment, the permission identifies the appropriate user, network, index, machine, etc. that will be involved in the restoration. Additionally, the permission may include a set of instructions for transmitting the fetched data, key used for encryption/decryption, etc. At step 504, the server retrieves the fetched data corresponding to the requested data source (e.g. the data that was fetched by the data translation process 400 and identified by the streaming permission). At step 506, the server transmits the fetched data over a network 112 to the user's 102 machine identified in the streaming permission (e.g., of step 502). The server, in various embodiments, determines whether all of the fetched data corresponding to the requested data source has been retrieved by comparing the list of retrieved and transmitted data to the streaming request. If all of the data has not been retrieved, then the server goes back to step 504 and continues to retrieve data. If all of the data has been retrieved, then the data streaming process ends. One skilled in the art will appreciate that this streaming process, which occurs generally at the same time as the data translation process and retrieves and transmits data as it is fetched, may permit the restoration of the operating system and files to occur in real-time. Thus, in various embodiments, the data streaming process gives a user 102 the experience of operating a machine that is being restored as if the machine had already been restored. Once the data has been fetched and streamed, then the data is presented so that the user can operate the machine.

Exemplary Data Presentation Process

Now referring to FIG. 6, an exemplary data presentation process 600 is shown for presenting the fetched and transmitted data in a format that is readable by an emulator, hypervisor, or similar virtual machine/device and then livemigrating between the presented data and the completed restored volume, according to one embodiment of the present system. Accordingly, at step 602, the system receives the fetched data corresponding to the requested data source from the server. The system generally, at step 604, assembles this data as a virtual volume (e.g., a volume that appears complete, by including a full file directory, but is actually a partial version of the data source because it does not contain all of the files in the directory) in a format that is readable by an emulator, hypervisor, or other similar virtual machine/device and also assembles the data into a file as part of the restoration process. An emulator, hypervisor, or other similar virtual machine/device is a piece of software, firmware, or hardware that creates and operates virtual machines, which are software executions of physical machines (e.g., computers, etc.). A user interacting with a virtual machine usually experiences the physical machine as if the user were actually operating the physical machine. In one embodiment, the system can mount (e.g., make the data accessible to the hypervisor, emulator, etc.) the data on a character or block device (e.g., disk devices without or with buffers, respectively) and/or store the received fetched data in a cache while creating a full copy of the restored machine for live-migration later. At step 606, the system presents the fetched and assembled data in the virtual volume to the emulator, hypervisor, etc. One skilled in the art will appreciate that this presentation enables the user to operate the machine that is being restored as if the restoration is already complete. The emulator, hypervisor, etc. generally reads the assembled and presented data in the virtual volume as the entire, fully-functional and restored machine and creates a virtual machine that appears to the user to be the entire data source even though the data source is still being fetched, transmitted, assembled, etc. This presentation may allow the user to interact with the machine as it is restored and make read and/or write requests to the system exponentially faster than in a traditional restoration process because the user does not have to wait for the restoration to complete before interacting with the machine.

At step 608, the system determines whether there is a read or write request from the user. For example, a user wants to open and revise a document that is contained within the data source. If there is a read request, then, at step 610, the system transmits a request for that particular data back to the server, where the particular data is fetched by the data translation process 400, as shown generally in FIG. 4. After transmitting the request for particular data at step 610, the system goes back to step 602 to receive the fetched data corresponding to the request for particular data. If there is a write request, at step 612, the system stores the write requests in a cache. In one embodiment, this cache is generally separate from the one being used for the received fetched data. After storing the write request or if there has been no read or write request, the system proceeds to step 614, where the system determines whether all the fetched data, which comprises the requested data source, has been received. If all of the fetched data has not been received, then the system returns to step 602. In various embodiments, the system associates the additionally fetched data with the virtual volume (e.g., inserts into the virtual volume any of the data that was fetched after the virtual volume was created so that the additional fetched data is contained within the virtual volume). If all of the fetched data has been received, then the system proceeds to step 616.

Still referring to FIG. 6, at step 616, the system merges the cached write requests with all of the fetched data comprising the requested data source that was assembled as part of the restoration process in step 604. One skilled in the art will appreciate that the merging of these two sets of data may allow a most recent version of the data that the user is attempting to restore to be provided to the user. At step 618, the system live-migrates the hypervisor, emulator, etc. from the presented virtual volume from step 606 to the merged data comprising the requested data source from step 616. Generally, this live-migration is seamless (e.g., is not noticeable by the user) and occurs by switching the virtual volume with the merged data as the source from which the hypervisor, emulator, etc. is presenting the virtual machine. After the live-migrate, the restoration process is generally complete and the presentation process ends.

Figure 7:
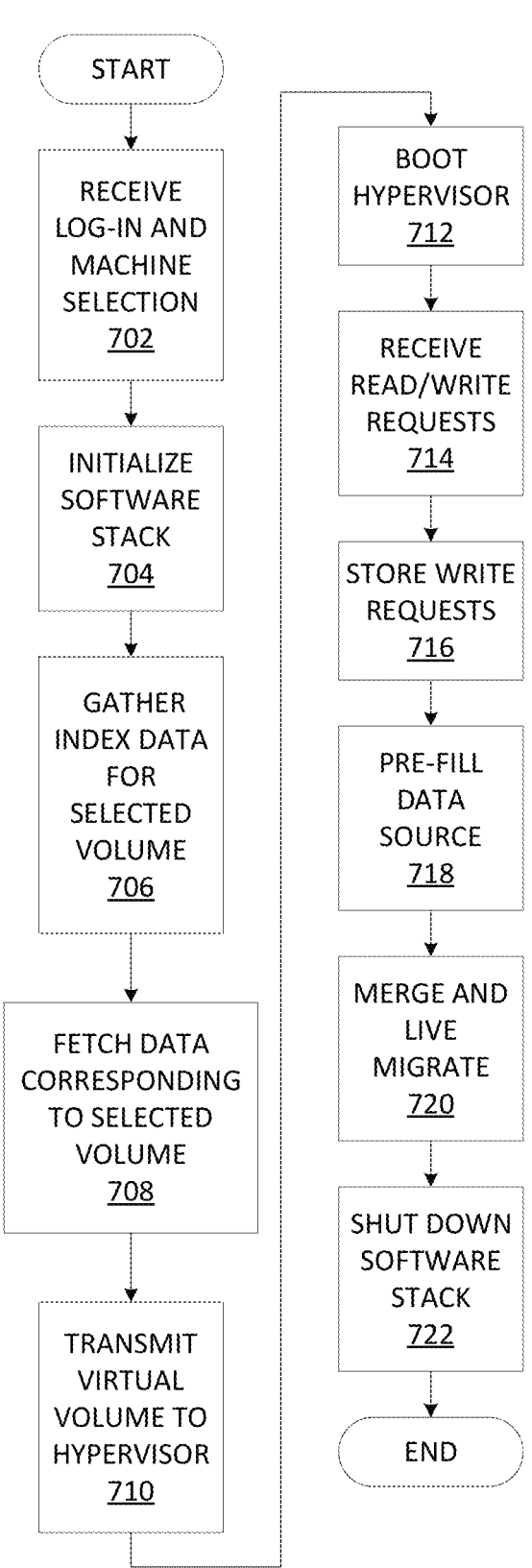
FIG. 7 is a flowchart showing an exemplary system embodiment according to one embodiment of the present system.

Referring now to FIG. 7, an exemplary flowchart depicting the steps of one embodiment of the present system is shown. At step 702, the user logs into a web portal and selects one or more machines (e.g., data sources) to boot, including the specific volume(s) to restore (e.g., various versions of a backup). At step 704, the system's software stack starts; at step 706, the system gathers, in real-time, the index data for the selected volume. The system generally determines, from the index data, what chunks of data are needed to represent the virtual volume, representing the selected volume, that will be transmitted to the hypervisor.

At step 708, the software begins fetching data corresponding to the selected volume. Next, at step 710, a virtual volume made up of a virtual file or virtual block device is presented (e.g., assembled, mounted, and transmitted) to the hypervisor. In one embodiment, this presentation is made in real-time. Generally, the hypervisor reads the virtual volume as a bootable full file or block device and operates normally without additional modification. At step 712, the hypervisor boots while the system continues to stream the data source (e.g., operating system). The hypervisor generally boots in a few minutes; thus, the virtual volume can be immediately usable.

Still referring to FIG. 7, the hypervisor makes read and write requests, which begin during the boot process, against the system's software stack at step 714. Generally, these requests are given priority over all other data fetching and are cached in the virtual volume. In one embodiment, thousands of these requests are made in real-time to boot a typical data source (e.g., operating system). The average request can be serviced in milliseconds and is made in the background of the hypervisor, which makes the servicing of the request imperceptible to the user. At step 716, the system stores write requests in a write transaction log for performance; the write transaction log is generally separate from the virtual volume. The write requests are stored in a separate log because, in various embodiments, the data source in object storage is immutable.

At step 718, the system begins to pre-fill (e.g., assemble) the entire data source, while continuing to give priority to data requests from the hypervisor. Once the data source is pre-filled, at step 720, the data source is simultaneously merged with the separate write transaction log and live-migrated to a new file or block device. Generally, this simultaneous merge and live-migration is performed in real-time, without impacting the user's ability to access the data or requiring the hypervisor to reboot. After the simultaneous merge and live-migration, the data source is now a standard block device or file (e.g., a disk device and not the virtual volume) and can be used as such. In one embodiment, this simultaneous merge and live-migration enhances the system's performance and provides an opportunity to transfer the data source to faster classes of storage (e.g., solid state drives). Finally, at step 722, after the simultaneous merge and live-migration, a command is sent to shut down the system's streaming software stack for this virtual volume. After the streaming software stack shuts down, the process ends.

FIGS. 8-10

Figure 8:
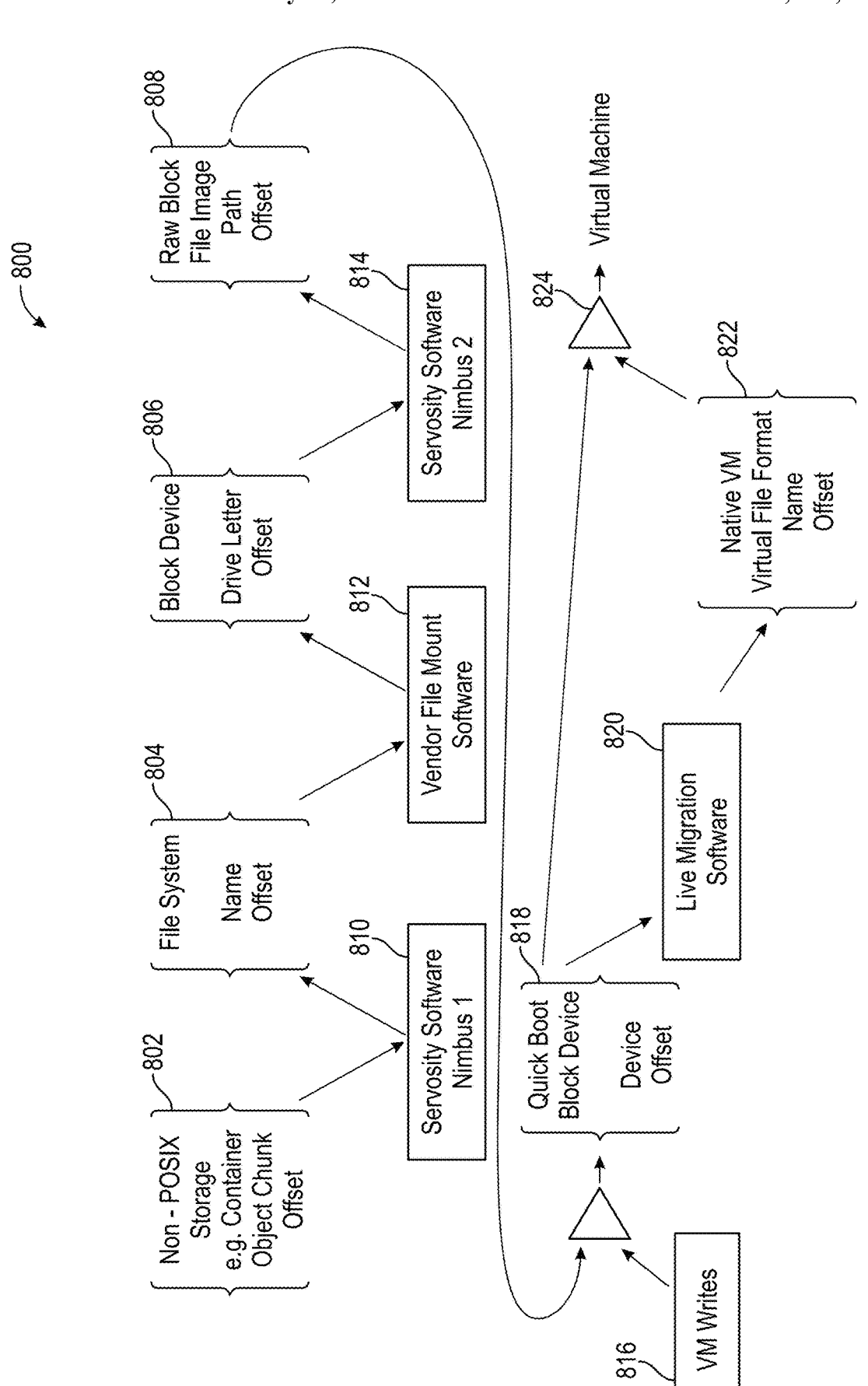
FIG. 8 is a flowchart showing an exemplary system process flow according to one embodiment of the present system.

FIG. 8 shows an exemplary flow from a backup stored in non-POSIX storage to a virtual machine, according to one embodiment of the present system. The backup can be, but is not limited to, a collection of files that is comprised of a base image and multiple incremental images (e.g., the backup could also be differential, etc.). Generally, these images can be recombined into a single bootable image that corresponds to the system state at the time the base or any of the incremental images is captured (e.g., the restore point). The raw block file image 808 is a representation of the disk image exactly as it would have appeared on a disk at the restore point. The virtual machine 824 is a program which creates a simulated computer (e.g., a hypervisor) which may be used to boot the raw block file image 808.

Still referring to FIG. 8, the intermediate steps 816-822 transform the raw block file image 808 into a virtual file format 822 that is readable by the virtual machine 824. In one embodiment, tools provided by the Linux operating system and tools provided by the virtual machine 824 (e.g., hypervisor) facilitate these steps 816-822. The raw block file image 808 is used both as a source for the quick boot block device 818 and a source to populate (in the background) a file in the virtual machine's 824 native file format (e.g., a virtual file format 822). Until the background copy is complete, the hypervisor generally uses information streamed from the memory of the quick boot block device 818. When the background copy is complete, the new file is used as a source and destination for system state for the virtual machine 824 and all the other system components, including everything from 802-814, are released. The remaining challenge is to find a way first to securely and efficiently store the backup images and then to efficiently turn those images into a raw block file image 808 that the virtual machine 824 can launch.

Figure 9:
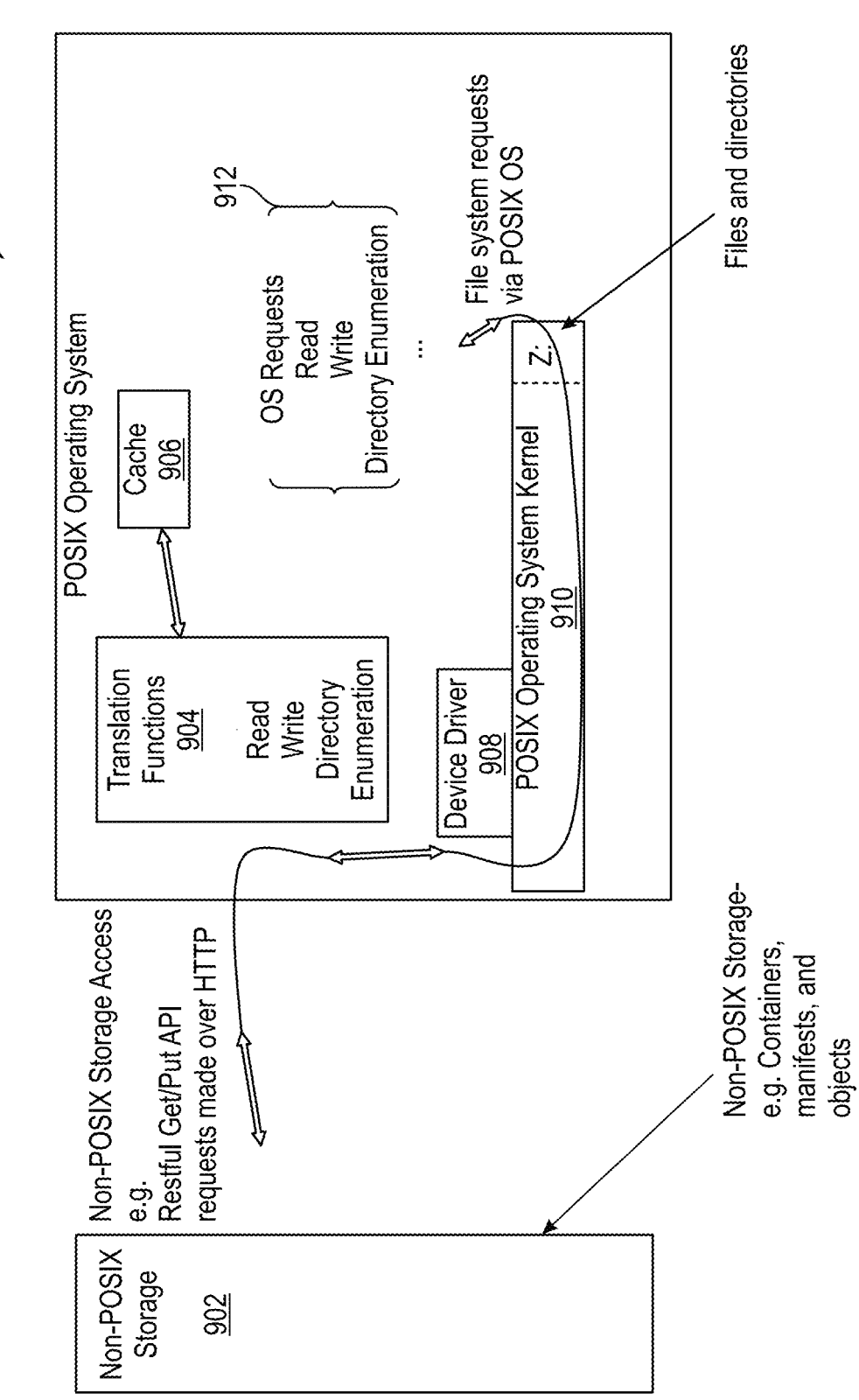
FIG. 9 is a flowchart showing an exemplary software process flow according to one embodiment of the present system.

FIG. 9 shows the design of Servosity Software Nimbus 1 810. Generally, there is no direct directory name or filename correspondence in object storage 902. Objects are referenced by container, manifest, and object. A cache 906 was added to the translation application 904 so that data accesses once made could be referenced again without going to object storage 902. In order to stream requests made to a file system, a device driver (e.g., Servosity Software Nimbus 1 810) was created which intercepts read, write, file creation, file deletion, directory enumeration, and other kinds of requests to the file system and turns them into corresponding object storage restful GET and PUT API requests made over http.

Figure 10:
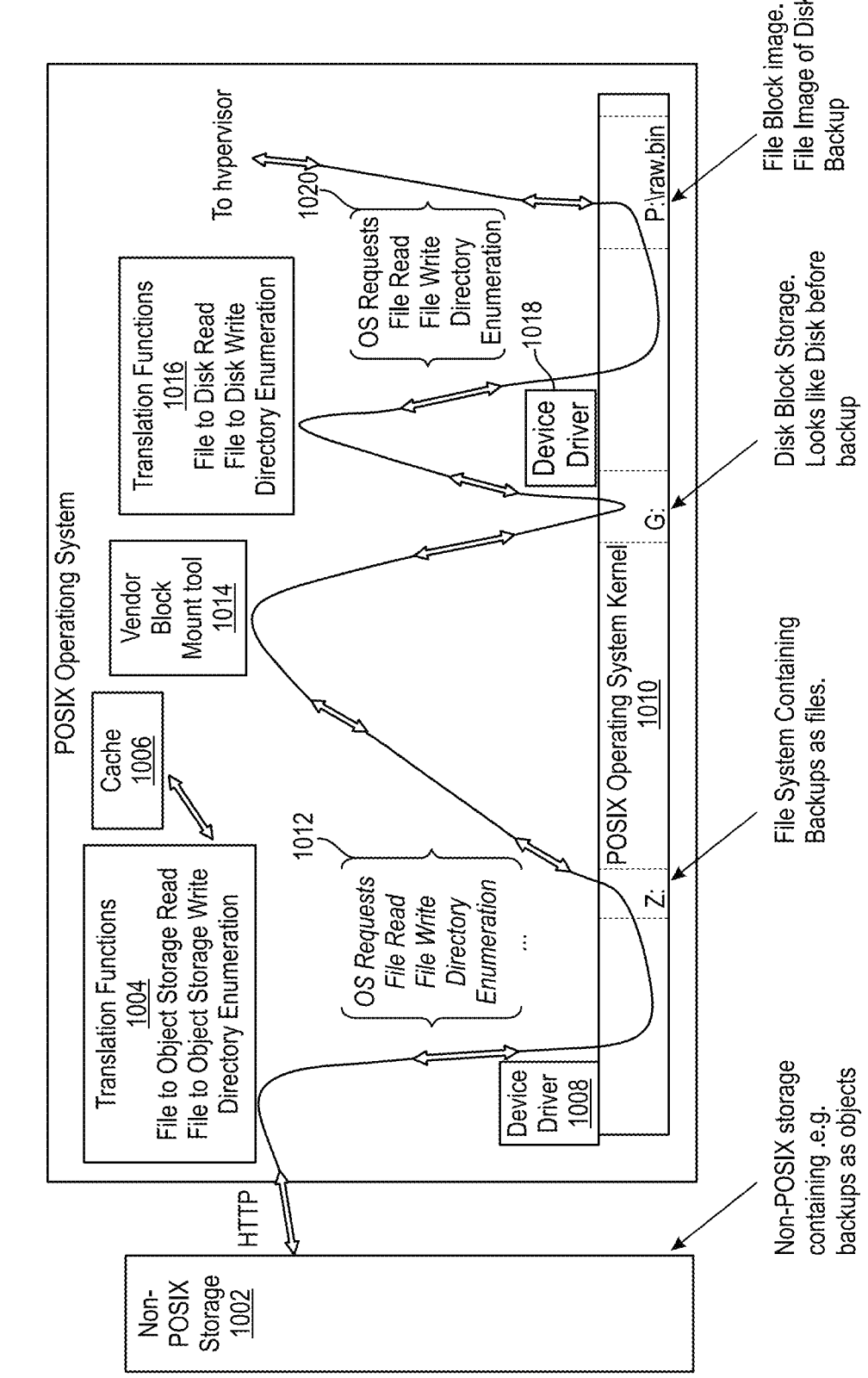
FIG. 10 is a flowchart showing an exemplary system process flow according to one embodiment of the present system.

FIG. 10 shows the complete stack that maps object storage all the way to raw block file image that a hypervisor can use to launch a virtual machine, according to one embodiment of the present system.

Exemplary Backup Process

According to certain embodiments of the present disclosure, the present system 114 can perform an initial backup of the original data, file, server, or system as a volume 104 prior to the subsequent restoration processes. In particular, the restoration processes described previously can operate effectively with systems that were backed up by third party storage systems and/or systems that were backed up via aspects of the present disclosure. In one embodiment, the user 102 can incrementally back up the system to the cloud instead of backing up the entire system. In other embodiments, the entire system (or server, file, set of files, or other data) can be backed up entirely. In various embodiments, the user 102 can use other types of backups including, but not limited to, differential backups instead of backing up the entire system. The system 114 may take the backup and parse and store it as millions of discrete chunks or blocks of data in a non-POSIX storage database. One skilled in the art will appreciate that this fragmentation of the backup allows the system to optimize its efficiency because it has to fetch fewer chunks or blocks for each read or write request from the user 102. Additionally, backups that are fragmented in this way create efficiencies in subsequent retrieval processes because the system is already knowledgeable about file locations, data items, and other discrete pieces of information about the backup.

Further Technical Details

According to certain embodiments of the present disclosure, the functionality of the relevant computing devices is improved. For example, by being able to access relevant content in an automatic and streamlined way, the ability for each mobile device in the system to interact with a relevant, physical machine is improved and made more efficient. Further, the above-described methods have many additional features not present in prior computing devices, as will be made clear by the appended claims.

From the foregoing, it will be understood that various aspects of the processes described herein are software processes that execute on computer systems that form parts of the system. Accordingly, it will be understood that various embodiments of the system described herein are generally implemented as specially-configured computers including various computer hardware components and, in many cases, significant additional features as compared to conventional or known computers, processes, or the like, as discussed in greater detail herein. Embodiments within the scope of the present disclosure also include computer-readable media for carrying or having computer-executable instructions or data structures stored thereon. Such computer-readable media can be any available media which can be accessed by a computer, or downloadable through communication networks. By way of example, and not limitation, such computer-readable media can comprise various forms of data storage devices or media such as RAM, ROM, flash memory, EEPROM, CD-ROM, DVD, or other optical disk storage, magnetic disk storage, solid state drives (SSDs) or other data storage devices, any type of removable non-volatile memories such as secure digital (SD), flash memory, memory stick, etc., or any other medium which can be used to carry or store computer program code in the form of computer-executable instructions or data structures and which can be accessed by a general purpose computer, special purpose computer, specially-configured computer, mobile device, etc.

When information is transferred or provided over a network or another communications connection (either hardwired, wireless, or a combination of hardwired or wireless) to a computer, the computer properly views the connection as a computer-readable medium. Thus, any such connection is properly termed and considered a computer-readable medium. Combinations of the above should also be included within the scope of computer-readable media. Computer-executable instructions comprise, for example, instructions and data which cause a general purpose computer, special purpose computer, or special purpose processing device such as a mobile device processor to perform one specific function or a group of functions.

Those skilled in the art will understand the features and aspects of a suitable computing environment in which aspects of the disclosure may be implemented. Although not required, some of the embodiments of the claimed inventions may be described in the context of computer-executable instructions, such as program modules or engines, as described earlier, being executed by computers in networked environments. Such program modules are often reflected and illustrated by flow charts, sequence diagrams, exemplary screen displays, and other techniques used by those skilled in the art to communicate how to make and use such computer program modules. Generally, program modules include routines, programs, functions, objects, components, data structures, application programming interface (API) calls to other computers whether local or remote, etc. that perform particular tasks or implement particular defined data types, within the computer. Computer-executable instructions, associated data structures and/or schemas, and program modules represent examples of the program code for executing steps of the methods disclosed herein. The particular sequence of such executable instructions or associated data structures represent examples of corresponding acts for implementing the functions described in such steps.

Those skilled in the art will also appreciate that the claimed and/or described systems and methods may be practiced in network computing environments with many types of computer system configurations, including personal computers, smartphones, tablets, hand-held devices, multiprocessor systems, microprocessor-based or programmable consumer electronics, networked PCs, minicomputers, mainframe computers, and the like. Embodiments of the claimed invention are practiced in distributed computing environments where tasks are performed by local and remote processing devices that are linked (either by hardwired links, wireless links, or by a combination of hardwired or wireless links) through a communications network. In a distributed computing environment, program modules may be located in both local and remote memory storage devices.

An exemplary system for implementing various aspects of the described operations, which is not illustrated, includes a computing device including a processing unit, a system memory, and a system bus that couples various system components including the system memory to the processing unit. The computer will typically include one or more data storage devices for reading data from and writing data to. The data storage devices provide nonvolatile storage of computer-executable instructions, data structures, program modules, and other data for the computer.

Computer program code that implements the functionality described herein typically comprises one or more program modules that may be stored on a data storage device. This program code, as is known to those skilled in the art, usually includes an operating system, one or more application programs, other program modules, and program data. A user may enter commands and information into the computer through keyboard, touch screen, pointing device, a script containing computer program code written in a scripting language or other input devices (not shown), such as a microphone, etc. These and other input devices are often connected to the processing unit through known electrical, optical, or wireless connections.

The computer that effects many aspects of the described processes will typically operate in a networked environment using logical connections to one or more remote computers or data sources, which are described further below. Remote computers may be another personal computer, a server, a router, a network PC, a peer device or other common network node, and typically include many or all of the elements described above relative to the main computer system in which the inventions are embodied. The logical connections between computers include a local area network (LAN), a wide area network (WAN), virtual networks (WAN or LAN), and wireless LANs (WLAN) that are presented here by way of example and not limitation. Such networking environments are commonplace in office-wide or enterprise-wide computer networks, intranets, and the Internet.

When used in a LAN or WLAN networking environment, a computer system implementing aspects of the invention is connected to the local network through a network interface or adapter. When used in a WAN or WLAN networking environment, the computer may include a modem, a wireless link, or other mechanisms for establishing communications over the wide area network, such as the Internet. In a networked environment, program modules depicted relative to the computer, or portions thereof, may be stored in a remote data storage device. It will be appreciated that the network connections described or shown are exemplary and other mechanisms of establishing communications over wide area networks or the Internet may be used.

Conclusion

The foregoing description of the exemplary embodiments has been presented only for the purposes of illustration and description and is not intended to be exhaustive or to limit the present systems methods to the precise forms disclosed. Many modifications and variations are possible in light of the above teaching. The embodiments were chosen and described in order to explain the principles of the systems and methods and their practical application so as to enable others skilled in the art to utilize the present systems methods and various embodiments and with various modifications as are suited to the particular use contemplated. Alternative embodiments will become apparent to those skilled in the art to which the present systems methods pertain without departing from their spirit and scope. Accordingly, the scope of the present systems methods is defined by the appended claims rather than the foregoing description and the exemplary embodiments described therein.

What is claimed is:

1. A computer system, comprising:
a data store; and
at least one hardware processor in communication with the data store, the at least one hardware processor being configured to:
receive a selection of a particular machine of a plurality of machines, wherein the particular machine corresponds to at least one volume;
generate a virtual volume for the particular machine;
present the virtual volume to a hypervisor;
cause the hypervisor to boot an operating system based on the virtual volume; and
convert the virtual volume to a standard block device subsequent to merging a stored write request.

2. The computer system of claim 1, wherein the at least one hardware processor is further configured to stream files from the at least one volume while the hypervisor is running.

3. The computer system of claim 1, wherein the virtual volume is configured to be immutable to the hypervisor.

4. The computer system of claim 1, wherein the at least one hardware processor is further configured to:

receive a write request from the hypervisor; and store the write request in a write transaction log separate from the virtual volume as the stored write request.

5. The computer system of claim 4, wherein the at least one hardware processor is further configured to:

determine that streaming to the virtual volume is complete; and merge the stored write request from the write transaction log to the virtual volume.

6. The computer system of claim 1, wherein the at least one hardware processor is further configured to:

receive a read request from the hypervisor; and prioritize streaming of data for the virtual volume corresponding to the read request.

7. A method, comprising:

receiving, via one of one or more processors, a selection of a particular machine of a plurality of machines, wherein the particular machine corresponds to at least one volume;

generating, via one of the one or more processors, a virtual volume for the particular machine;

presenting, via one of the one or more processors, the virtual volume to a hypervisor;

causing, via one of the one or more processors, the hypervisor to boot an operating system based on the virtual volume; and converting, via one of the one or more processors, the virtual volume to a standard block device subsequent to merging a stored write request.

8. The method of claim 7, further comprising streaming, via one of the one or more processors, files from the at least one volume while the hypervisor is running.

9. The method of claim 7, wherein the virtual volume is configured to be immutable to the hypervisor.

10. The method of claim 7, further comprising:

receiving, via one of the one or more processors, a write request from the hypervisor; and storing, via one of the one or more processors, the write request in a write transaction log separate from the virtual volume as the stored write request.

11. The method of claim 10, further comprising:

determining, via one of the one or more processors, that streaming to the virtual volume is complete; and merging, via one of the one or more processors, the stored write request from the write transaction log to the virtual volume.

12. The method of claim 7, further comprising:

receiving, via one of the one or more processors, a read request from the hypervisor; and prioritizing, via one of the one or more processors, streaming of data for the virtual volume corresponding to the read request.

13. A non-transitory computer-readable medium embodying a program that, when executed by at least one computing device, causes the at least one computing device to:

receive a selection of a particular machine of a plurality of machines, wherein the particular machine corresponds to at least one volume;

generate a virtual volume for the particular machine;

present the virtual volume to a hypervisor;

cause the hypervisor to boot an operating system based on the virtual volume; and convert the virtual volume to a standard block device subsequent to merging a stored write request.

14. The non-transitory computer-readable medium of claim 13, wherein the program further causes the at least one computing device to stream files from the at least one volume while the hypervisor is running.

15. The non-transitory computer-readable medium of claim 13, wherein the virtual volume is configured to be immutable to the hypervisor.

16. The non-transitory computer-readable medium of claim 13, wherein the program further causes the at least one computing device to:

receive a write request from the hypervisor; and store the write request in a write transaction log separate from the virtual volume as the stored write request.

17. The non-transitory computer-readable medium of claim 16, wherein the program further causes the at least one computing device to:

determine that streaming to the virtual volume is complete; and merge the stored write request from the write transaction log to the virtual volume.

18. The non-transitory computer-readable medium of claim 13, wherein the program further causes the at least one computing device to:

receive a read request from the hypervisor; and prioritize streaming of data for the virtual volume corresponding to the read request.

* * * * *